United States Patent [19]
Waaske

[11] 3,922,697
[45] Nov. 25, 1975

[54] DIAPHRAGM SHUTTER FOR PHOTOGRAPHIC CAMERAS

[75] Inventor: Heinz Waaske, Mascherode, Germany

[73] Assignee: Rollei-Werke Franke & Heidecke, Braunschweig, Germany

[22] Filed: May 3, 1974

[21] Appl. No.: 466,817

[30] Foreign Application Priority Data
May 8, 1973  Germany............................ 2323087

[52] U.S. Cl................................. 354/228; 354/38
[51] Int. Cl.²........................................... G03B 9/00
[58] Field of Search .............. 354/36, 38, 228, 230

[56] References Cited
UNITED STATES PATENTS
3,375,769   4/1968   Kiper................................ 354/230
3,668,988   6/1972   Engelsmann...................... 354/38

Primary Examiner—John M. Horan
Attorney, Agent, or Firm—Stonebraker, Shepard & Stephens

[57] ABSTRACT

A diaphragm shutter combining the functions of the diaphragm and a shutter. A pair of slides move relative to each other to open the exposure aperture to start the exposure. A pair of pivoted blades then swing relative to each other to close the exposure aperture to terminate the exposure. A rotating cam controls the speed at which the slides move in an opening direction, in such manner that the opening movement starts relatively slowly and then progresses faster. This enables the total exposure time to be somewhat increased for a given exposure value or quantity of light falling on the film, as compared with the shorter total exposure time needed for the same quantity of light on the film, if the opening slides move at a uniformly high speed. The longer exposure time, for a given exposure value, results in more accurate operation of the shutter.

9 Claims, 6 Drawing Figures

DIAPHRAGM SHUTTER FOR PHOTOGRAPHIC CAMERAS

BACKGROUND OF THE INVENTION

The invention relates to photographic camera shutters having one set of opening elements which are moved to open the exposure aperture to commence the exposure, and a separate set of closing elements which are moved to close the exposure aperture to terminate the exposure. Merely for convenience of description, the opening elements may be referred to as slides, and the closing elements may be called blades. These terms are purely arbitrary. Either or both sets could, if desired, be referred to as blades, the term which is more commonly used in the photographic shutter art.

For relatively long exposures, the closing elements do not start their closing movements until the opening elements have already reached their fully open position. However, for shorter or high speed exposures, the closing elements start to close before the opening elements reach their fully open position. Under these circumstances, it is the timing of the closing elements with respect to the timing of the opening elements which determines the maximum aperture or stop of the exposure, and to this extent a mechanism of this kind performs the function of a diaphragm as well as a shutter, and so may be referred to as a diaphragm shutter. It is to this action of a device serving as both a diaphragm and a shutter, during very short exposures, that the present invention relates.

An object of the invention is to provide a generally improved and more satisfactory shutter mechanism of this type, having improved and more reliable operation particularly during relatively short or fast exposures, when the closing elements perform their closing movements before the opening elements have reached fully open position.

In furtherance of the above mentioned object, it is another object of the invention to provide mechanism for controlling the opening movements of the opening elements in such a way that they start to open relatively slowly and then increase the speed of the opening movement, with the result that the total exposure time from the beginning of the opening movement to the completion of the closing movement is somewhat greater (for the admission of a given quantity of light) than would be the case if the opening elements opened at a uniform fast rate from the very beginning of the opening movement. This increase in the total exposure time (bearing in mind that we are considering only very fast exposures where the closing movement is completed before the opening movement is completed) results in a more reliable operation, by mechanism which is easier and less expensive to construct, than is the case when the opening movement is a straight line movement at a uniform rate.

BRIEF DESCRIPTION OF THE DRAWINGS

FIG. 3b is a schematic rear elevational view of the shutter shown in FIG. 3a, illustrating additional parts lying to the rear of the parts shown in FIG. 3a.

DESCRIPTION OF THE PREFERRED EMBODIMENTS

Figure 1:
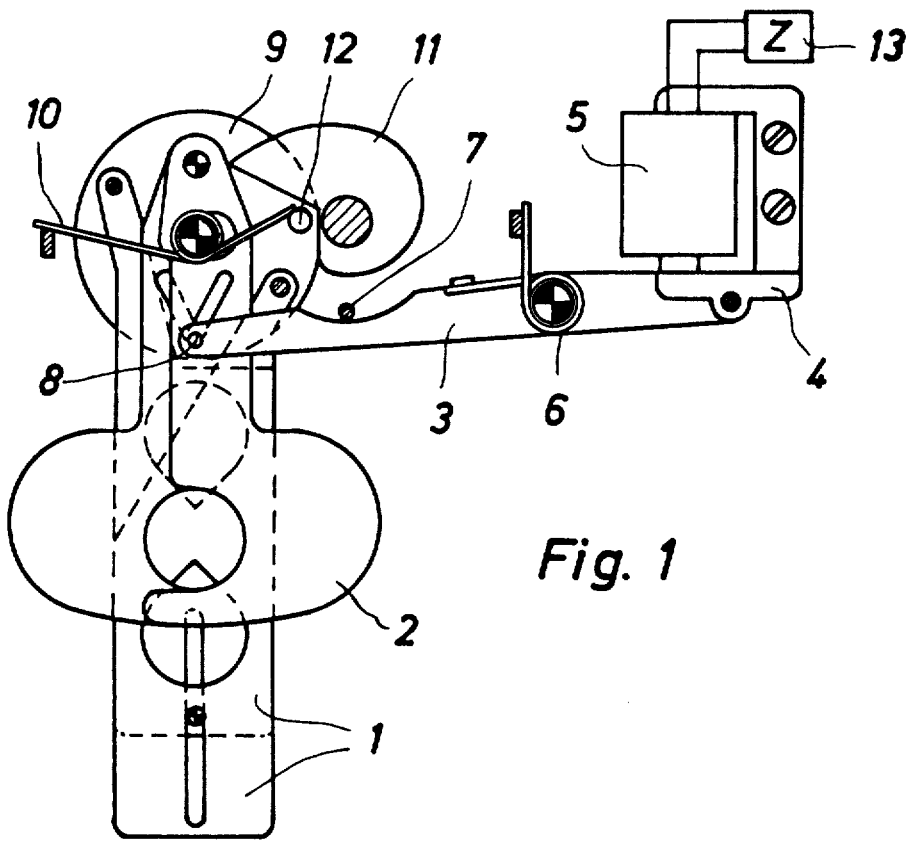
FIG. 1 is a schematic rear elevational view of a camera shutter in accordance with one embodiment of the invention, with opening slides and closing blades shown in their initial or starting position, ready for making an exposure.

In prior diaphragm shutters of the same general kind, the opening movements of the opening elements are continuously subjected, throughout the entire opening movement, to a retarding mechanism (e.g., a clockwork retard or a known equivalent) which causes the opening movement to proceed at a uniform rate, in what may be called a straight line manner. FIG. 2a illustrates the action graphically, when it is desired to make a fast exposure at a small diaphragm aperture. The curve O shows the time characteristics of the opening movement, and the curve Sch indicates the closing movement. The height of the intersection E where these curves cross indicates the maximum aperture of the exposure, which in this example is $f/5.6$, as indicated by the ordinate scale at the left. All together an exposure value or quantity of light corresponding to the shaded area of the graph has been obtained. With this type of diaphragm shutter, a certain particular diaphragm opening or aperture will always be obtained for a given exposure time.

As may be seen from FIG. 2a, the exposure time accompanying a small diaphragm aperture is always extremely short. With such a short exposure time, even minor deviations from the exact exposure time value which is desired, would result in a different diaphragm aperture value from that which is desired and determined by the exposure time and the luminous density of the object. Such minor variations may be caused, for example, by the response time of the timing unit used, or the response time of the mechanical parts of the shutter itself. Diaphragm shutters of this kind must therefore be very finely adjusted and must operate with complete accuracy. Such a shutter is very difficult to construct, and extremely expensive.

As already indicated, the purpose of the present invention, therefore, is to provide a diaphragm shutter of the same general type, but improved so that, in the range of small diaphragm apertures, an increase in the exposure time is obtained by simple means, with the exposure value or quantity of light reaching the film remaining the same in each case, and without leading to undesirably long exposure times in the range of large diaphragm apertures. To this end, it is a purpose of the invention to provide a diaphragm shutter in which the diaphragm aperture size increases very slowly at first, and then continues to widen with increasing speed.

This is achieved, according to the invention, by connecting the opening elements or slides to an actuating or operating element or member which is driven by a cam. The cam is so shaped that the opening movement of the slides will start relatively slowly and then speed up to a faster rate, as the opening movement progresses. The slow initial rate of opening serves to lengthen the exposure time (for a given exposure value) for short exposures at relatively small apertures, so as to avoid the above mentioned troublesome exposures of very short duration, and the higher or speedier rate of travel of the opening slides after the initial slow travel serves to reduce the total exposure time to an acceptable small amount when making longer exposures at larger aperture.

Also it is found to be advisable, according to the present invention, to provide either the cam mechanism or the operating member, or both, with an additional mass acting somewhat as a flywheel and serving to stabilize the drive and smooth out any irregularities.

Figure 2B:
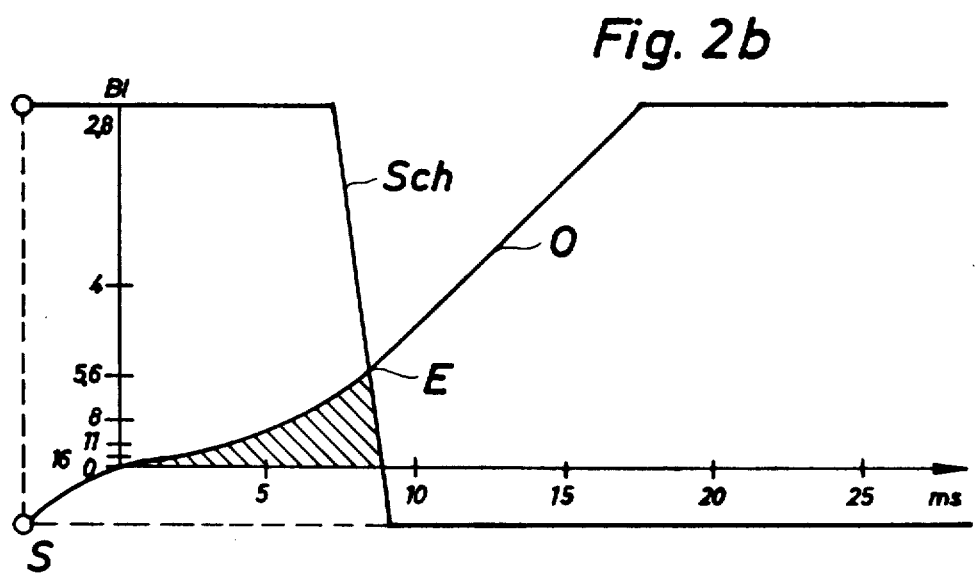
FIG. 2b is a similar graph illustrating the action when, according to the present invention, the opening elements start their opening movement relatively slowly, and then speed up to a faster movement.
Figure 2A:
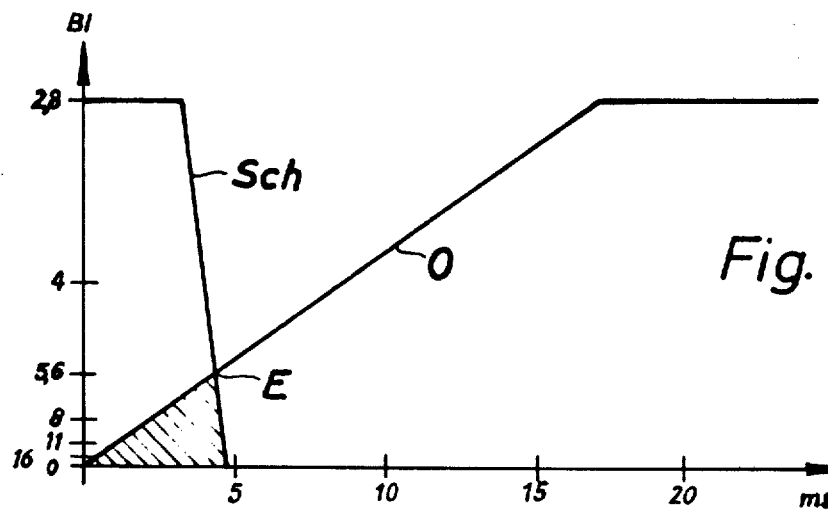
FIG. 2a is a graph illustrating the time and aperture characteristics of opening and closing elements during short exposures with a conventional system where the opening elements perform a straight line movement at uniform speed, the ordinate representing the aperture according to conventional $f$ numbers and the abscissa representing time in milliseconds.

With the improved construction according to the present invention, the action will be as illustrated by the graph in FIG. 2b, rather than that shown in FIG. 2a. As before, the curve O shows the opening movement, with aperture plotted against time, and the curve Sch represents the closing movement. The shaded area represents the exposure value or quantity of light reaching the film, and is exactly the same in FIG. 2b as in FIG. 2a, and the intersection point E is at the same elevation, representing an aperture of f/5.6. But it will be observed that the total time of exposure has been considerably lengthened. Whereas the total exposure time in FIG. 2a was a little less than 5 milliseconds, the exposure time in FIG. 2b has been lengthened to about 9 milliseconds although the exposure value (quantity of light admitted) with this exposure is exactly the same as the one in FIG. 2a.

This lengthening of the exposure, while maintaining the same exposure value, has the result that the mechanism is not so delicate and need not be so finely adjusted, and can be made much more economically. A small variation of, for example, one-half or one-quarter of a milliseconds, would not be so serious in an exposure of about 9 milliseconds, as it would be in an exposure of less than 5 milliseconds.

A first embodiment of the present invention will now be described with reference to FIG. 1. A pair of opening slides is shown at 1, and a pair of closing blades is shown at 2. The opening slides and closing blades jointly form the required diaphragm aperture. The blades are held in open position by a shutter lever 3 having at one end an armature 4 cooperating with an electromagnet 5. The lever 3 is fulcrumed at an intermediate point and biased by a spring 6 which tends to turn the arm clockwise on its fulcrum, to pull the armature 4 away from the electromagnet. A pin 8 at the opposite end of the lever 3 engages slots in the shutter blades 2. The slots are inclined in such a way that when the lever is in the position shown in FIG. 1, the shutter blades 2 are in their open positions. When the lever 3 swings clockwise from the position shown in FIG. 1, under the influence of the spring 6, the shutter blades 2 are closed. A resetting pin 7 swings around an arc while the shutter is being tensioned or made ready for the next exposure, and restores the lever 3 from its actuated clockwise position to the tensioned or ready counterclockwise position shown in FIG. 1.

The opening slides 1 are pivoted respectively at diametrically opposite pivot points on the face of a cylindrical operating member or actuating element 9, which may also be called an adjusting device. The opening slides are held in closed position by a spring 10 acting on the operating member 9 to tend to turn it clockwise to a limit position.

The drive of the actuating member 9 is effected through a cam disk 11 which, in the course of its rotation, acts on a pin 12 projecting from the end of the member 9. The drive of the cam 11, in turn, is accomplished from a driving spring, through a rack and pinion connection, further described below in connection with FIGS. 3b and 3c, which relate particularly to another embodiment of the invention. However, all of the parts present in FIG. 1 are also present in the embodiment illustrated in FIGS. 3b and 3c, so these views should be considered in connection with FIG. 1 in arriving at an understanding of the structure. The difference between the two embodiments is simply that the second embodiment includes some additional parts not present in FIG. 1, but without any change of the parts which are present in FIG. 1.

The moment at which the closing motion of the closing blades 2 commences is determined by a time formation unit or timer 13 of conventional construction, which at the proper time produces a signal for the interruption of the flow of current which energizes the electromagnet 5.

As the cam 11 turns clockwise from its initial starting position shown in FIG. 1, it acts on the pin 12 of the actuating element 9 and turns the element 9 counterclockwise against the force of its spring 10, thereby moving one of the opening slides downwardly and pulling the other opening slide upwardly so that the apertures in the two opening slides begin to overlap each other, and then continue the overlap until full or maximum aperture is reached, so far as the opening slides are concerned. The shape of the cam 11 is such that, as illustrated by the graph in FIG. 2b. the opening slides move fairly rapidly to the point where the openings in the slides first begin to overlap each other to permit entrance of light, then the movement proceeds relatively slowly, and gradually increases until maximum velocity of the slides is achieved at about 9 milliseconds after the opening commences. Thereafter the opening slides continue to move uniformly with rapid velocity, as indicated by the straight inclined portion of the curve O in FIG. 2b.

Figure 3A:
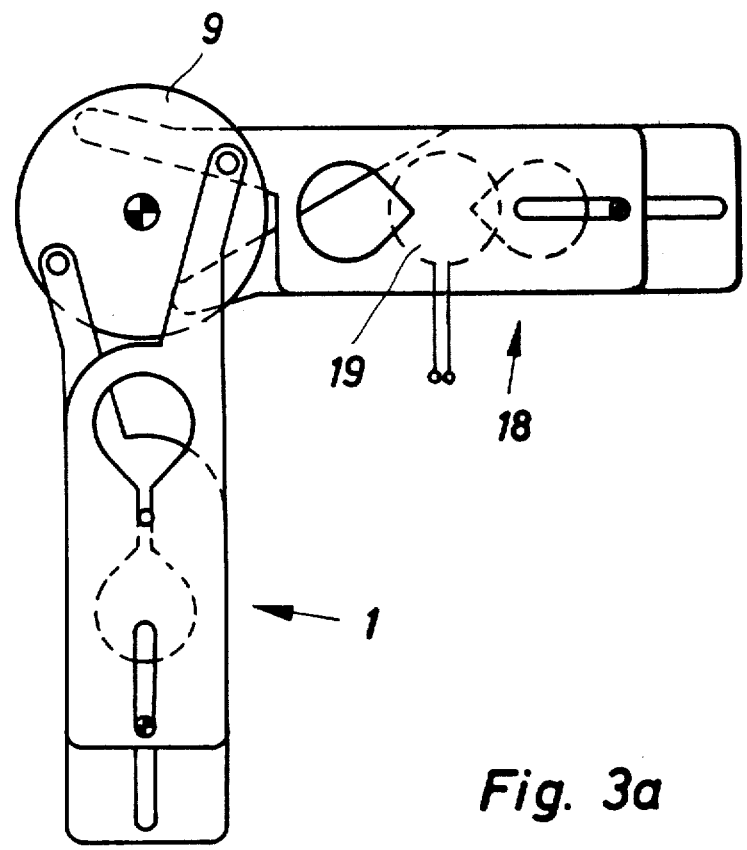
FIG. 3a is a view similar to a portion of FIG. 1, with parts omitted, illustrating an additional set of slide elements according to a modification of the invention, these additional elements controlling passage of light to a photoelectric cell.
Figure 3B:
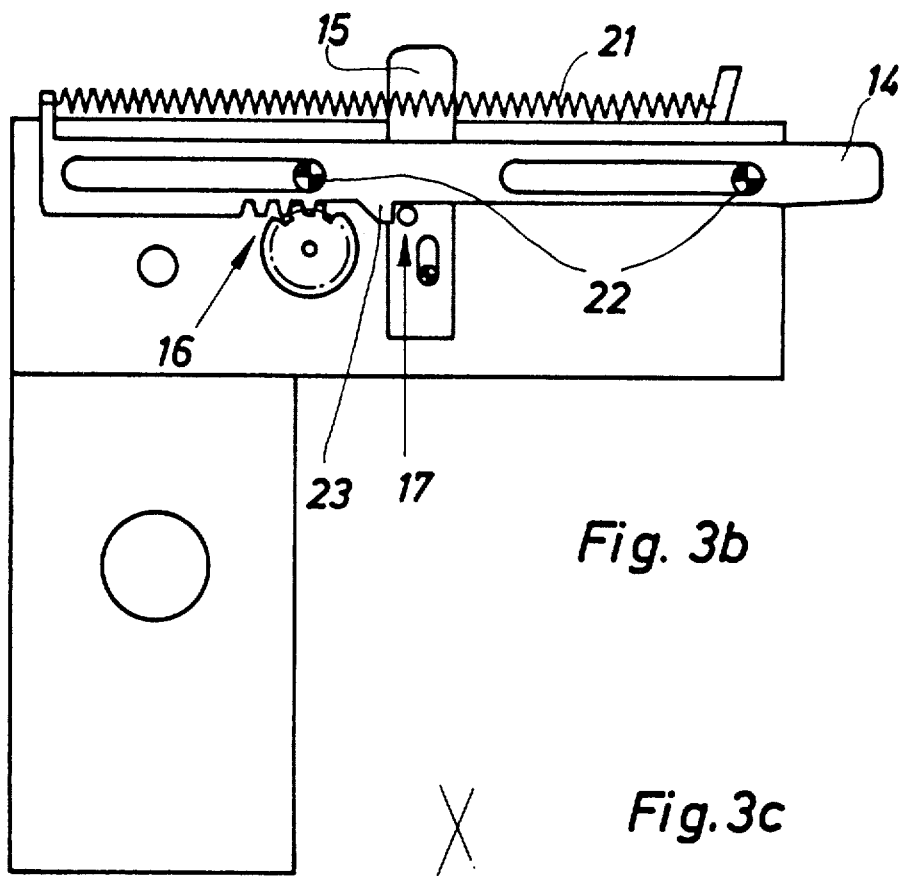
Figure 3C:
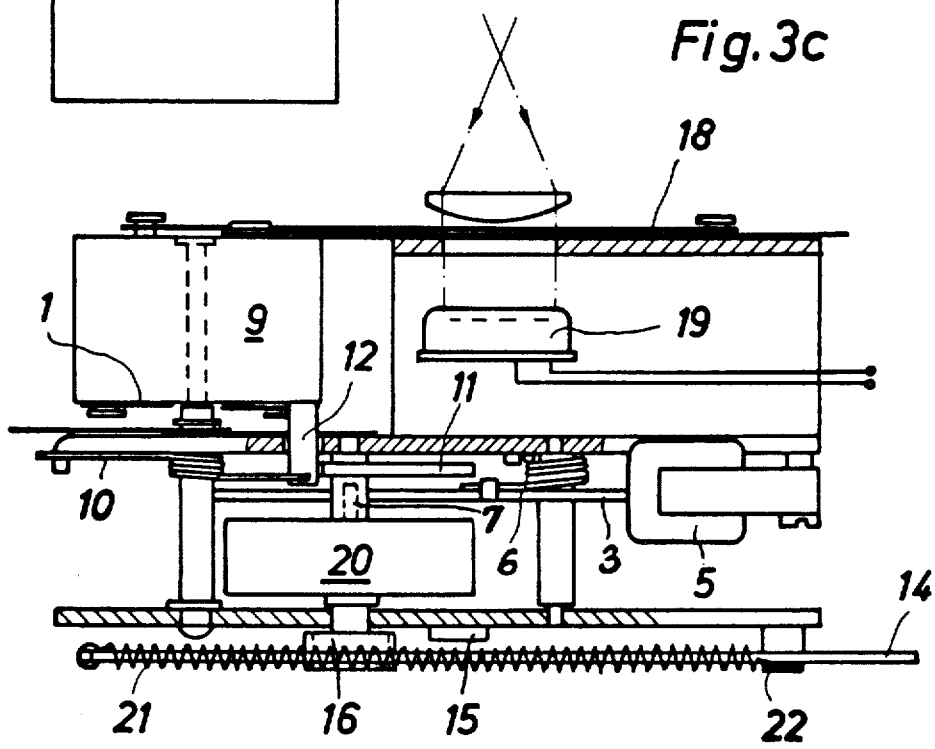
FIG. 3c is a schematic top plan view of the mechanism shown in FIGS. 3a and 3b.

Referring now to the embodiment illustrated in FIGS. 3a, 3b, and 3c, the shutter in this second embodiment has all of the features above described in connection with FIG. 1, and in addition has a second pair of opening slides 18 arranged with their sliding axes at approximately a right angle to the direction of the sliding axes of the opening slides 1, as seen especially in FIG. 3a. The second set of slides 18 serves to cover and uncover a photocell 19 (FIGS. 3a and 3c) located behind the slides 18. The slides 18 are pivotally connected to the same actuating member 9 to which the opening slides 1 are pivoted, but at the opposite end or face thereof. Hence the slides 18 will move in unison with the slides 1, and will open exactly when the slides 1 open. The photocell 19, whose light is controlled by the slides 18, is electrically connected to the timer unit 13 above mentioned.

The cam disk 11 is mounted on a shaft which carries an additional mass 20 acting as a flywheel to stablize the rotation of the cam shaft and to tend to keep the rotation uniform. The previously mentioned pin 7 projects from one face of the flywheel, and overlies the lever 3.

The cam shaft also carries a pinion 16 having teeth meshing with rack teeth on a rack slide member 14 mounted and guided on pins 22 extending through longitudinal slots in the slide 14. A spring 21 tends to move the slide rightwardly when viewed as in FIG. 3b. An abutment shoulder 23 on the rack slide engages a pin 17 on the release slide or trigger member 15. It will be readily apparent from FIG. 3b that so long as the trigger member 15 is in the position illustrated, the rack slide 14 cannot move rightwardly, but if the trigger member 15 is slightly depressed, the pin 17 thereon will move out of engagement with the shoulder 23, and the spring 21 will then move the rack slide 14 rightwardly, so that the rack teeth thereon, meshing with the pinion 16, will serve to turn the cam shaft in a clockwise direction, turning the cam 11 and the flywheel 20 with it.

The operation of the diaphragm shutter is as follows: to cock or tension the shutter ready for the next exposure, the rack slide 14 is pushed leftwardly (viewed as in FIG. 3b) to tension its spring 21, until the shoulder 23 thereon is caught by the pin 17 on the trigger member 15. This leftward movement of the rack slide serves to turn the pinion 16 counterclockwise, moving the cam 11 to the position shown in FIG. 1. The pin 12 on the actuating device 9 can follow along the slope of this cam (under the influence of the spring 10) as the cam turns counterclockwise, so that the shutter opening slides 1 are restored to their initial or starting position. At the same time, the counterclockwise rotation of the flywheel 20 carries the pin 7 down onto the top of the lever 3, to swing this lever counterclockwise on its pivot, thereby to open the shutter blades 2 to their initial starting position shown in FIG. 1, and to bring the armature 4 of the lever 3 up against the electromagnet 5.

To initiate the exposure, the operator presses downwardly on the release slide or trigger member 15. This occurs at the point S on the time graph, FIG. 2b. The downward movement of the trigger 15 also closes a conventional electric contact (not shown) which starts the running of the electrical timer or time formation system 13. The slide 14 starts to move rightwardly under the influence of the spring 21, thereby turning the pinion 16 in a clockwise direction, carrying with it the cam 11, the flywheel 20, and the pin 7 mounted on the flywheel. This moves the pin 7 out of the zone of movement of the shutter lever 3, which is held in the starting position by the attraction of the armature 4 to the electromagnet 5, which is now being energized.

The cam 11 acts on the pin 12 of the actuating device 9, and begins to move the member 9 in a counterclockwise direction, so that the slides 1 pivotally connected to the member 9 begin to move, and the second set of slides 18, also pivoted to the same member 9, likewise begin to move. At first, the respective openings in the two sets of slides are still out of alignment with each other and no light is admitted. This part of the motion, with relation to time, is represented by the curve at the lower left corner of FIG. 2b, from the point S to the point o at the beginning of the time scale.

As the motion continues, the openings in the two slides 1 reach each other and begin to overlap to begin the admission of light through these slides, this being at the point o in FIG. 2b. Simultaneously, the corresponding openings in the slides 18 which control the light flow to the photocell 19, likewise begin to open. From here on, the size of the opening formed by the increasing overlap of the holes in the slides 1, with relation to passage of time, is illustrated by the curve O in FIG. 2b. The same is true of the opening through the supplementary slides 18 which control the light to the photocell. As clearly seen in FIG. 2b, the opening is very gradual or slow at first, and then speeds up. This slow opening followed by increasing speed of opening is determined by the shape of the approximately spiral curve of the cam disk 11, the curve being designed to give the desired increasing velocity to the actuating member 9. This is aided by the flywheel 20 which, due to its inertia, tends to resist the start of the opening movement, thereby keeping it slow, but which also tends to keep the parts moving steadily at a constant rate, once it has speeded up to the desired maximum velocity.

In the meantime, a photocell (which may be either the photocell 19, behind the supplementary slide elements 18, or another similar photocell which may be placed behind the shutter if there are no such supplementary slide elements, as in FIG. 1) is producing a signal to the time formation unit 13, which has determined the time factor required for correct exposure under prevailing light conditions, and it interrupts the supply of current to the electromagnet 5, at the proper time. When current ceases to flow through the electromagnet 5, the attraction to the armature 4 ceases, and the spring 6 can turn the lever 3 clockwise, pulling the armature away from the electromagnet and at the same time raising the pin 8 which, on account of the sloping slots in the closing blades 2, causes these blades to close suddenly under the force of the spring 6. This occurs at the point E in the graph, FIG. 2b. The exposure of the film is thus terminated. It is seen from the graph that the maximum diaphragm aperture at the termination of the exposure is, for example, 5.6, as shown on the ordinates, and the exposure time is indicated by the value, about 8.5 milliseconds, on the abscissa scale. The exposure value or quantity of light which has passed through the lens to the film can be determined by integrating the separate portions of the opening curve and the closing curve, that is, the area which is shaded in the graph.

The cylindrical operating member or adjusting device 9 is quite thick in an axial direction, and has considerable mass. Owing to its mass this device 9, like the flywheel 20, produces a certain stablization effect in the cycle of movements performed by the opening slides 1, inasmuch as differences in spring tension in the driving spring 21, and differences in friction, caused by temperature fluctuations between individual driving elements, tend to be balanced out or smoothed out by the flywheel effect of these large masses 9 and 20. As a result of the particular construction of the cam disk 11, taking into account the masses to be moved, the opening movement of the opening slides 1 is caused to take such a course that the diaphragm aperture, after release action or trigger movement, at first only widens slightly, then widens with increasing speed, that is, increases progressively. This not only enables the object of the invention to be achieved, but also provides greater depth of field for the photographs, even with smaller diaphragms owing to the longer exposure times now obtainable.

What is claimed is:

1. A shutter for photographic cameras, comprising opening elements movable relative to each other to provide a light-admitting opening to initiate an exposure, closing elements movable relative to each other to block light to terminate the exposure, and control means for controlling movement of said opening elements at a relatively slow speed at the beginning of an exposure and gradually increasing the speed of opening movement of said opening elements during a subsequent interval of the exposure, said control means comprising an actuating device for directly actuating said opening elements, and a cam for driving said actuating device, said cam having a shape effective to produce said relatively slow speed followed by said gradually increasing speed.

2. The invention defined in claim 1, wherein said actuating device has a substantial mass acting as a flywheel.

3. The invention defined in claim 1, wherein said cam is coupled to an additional mass acting as a flywheel.

4. The invention defined in claim 1, wherein said actuating device is rotatable about an axis and has a pin parallel to and offset from said axis, and wherein said cam engages said pin.

5. The invention defined in claim 1, further comprising a toothed rack movable longitudinally, a spring biasing said rack for movement in one longitudinal direction, a pinion meshing with said rack to be turned by longitudinal movement of the rack, and a coupling between said pinion and said cam to turn the cam upon rotation of the pinion.

6. The invention defined in claim 1, further comprising additional opening elements (18) spaced from and movable simultaneously with said first mentioned opening elements (1), and a photocell (19) placed behind said additional opening elements (18) in position to receive light only when said additional elements provide a passage for light to said photocell.

7. The invention defined in claim 1, further comprising a lever for operating said closing elements, a spring tending to move said lever to a position closing said closing elements, an electromagnet for holding said lever in a position in which said closing elements are open so long as current is flowing in said electromagnet, and a timing device for stopping flow of current in said electromagnet so that said spring may move said lever to close said closing elements.

8. A diaphragm shutter for photographic cameras, comprising opening elements movable relative to each other to provide a light-admitting opening to initiate an exposure, closing elements movable relative to each other to block light to terminate the exposure, the extent to which the opening elements open before the closing elements become effective serving to determine the effective aperture at which the exposure is made, an actuating member (9) operatively connected to said opening elements to move them, a driving element (21) for driving said actuating member, and a cam (11) operatively interposed between said driving element and said actuating member to control the rate of movement of said actuating member in response to a given degree of force exerted by said driving element; said cam being shaped to drive said opening elements at different rates of speed during different portions of their opening movements, for a given uniform rate of movement of said cam.

9. A photographic shutter comprising a single pair of opening blades movable relative to each other from closed position to open position to initiate an exposure, a single pair of closing blades movable relative to each other from open position to closed position to terminate an exposure, said opening blades being movable through an initial range of movement from a rest position to a position in which they just start to open for passage of light and through a subsequent range of movement during which they open to a progressively increasing extent, and means for moving said opening blades at a relatively fast rate during said initial range, then at a slower rate at the beginning of said subsequent range, and at a gradually increasing rate during a portion of said subsequent range.

* * * * *